US009887797B2

United States Patent
Rafel Porti

(10) Patent No.: US 9,887,797 B2
(45) Date of Patent: Feb. 6, 2018

(54) OPERATIONALLY RESILIENT OPTICAL NETWORK

(71) Applicant: British Telecommunications Public Limited Company, London (GB)

(72) Inventor: Albert Rafel Porti, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 15/109,280

(22) PCT Filed: Dec. 24, 2014

(86) PCT No.: PCT/GB2014/000526
§ 371 (c)(1),
(2) Date: Jun. 30, 2016

(87) PCT Pub. No.: WO2015/101763
PCT Pub. Date: Jul. 9, 2015

(65) Prior Publication Data
US 2016/0329984 A1 Nov. 10, 2016

(30) Foreign Application Priority Data
Dec. 31, 2013 (EP) .................................... 13250134

(51) Int. Cl.
*H04J 14/02* (2006.01)
*H04B 10/032* (2013.01)
(52) U.S. Cl.
CPC ........ *H04J 14/0295* (2013.01); *H04B 10/032* (2013.01); *H04J 14/025* (2013.01);
(Continued)
(58) Field of Classification Search
CPC .................... H04J 14/0287–14/0297; H04B 10/03–10/032; H04B 10/038; H04Q 11/0001–11/0071
See application file for complete search history.

(56) References Cited

U.S. PATENT DOCUMENTS

2006/0104638 A1 5/2006 Chung et al.
2008/0037981 A1* 2/2008 Mukojima ......... H04Q 11/0067
398/10
(Continued)

FOREIGN PATENT DOCUMENTS

EP 2525517 A1 11/2012
EP 2775733 A1 9/2014
(Continued)

OTHER PUBLICATIONS

Shohei et al., "Architecture of full-mesh WDM-PON with protection," Joint Conference of the Opto-Electronics and Communications Conference (OECC) and the Australian Conference on Optical Fibre Technology (ACOFT) (Jul. 7-10, 2008), Syndney, AU, IEEE, Piscataway, NJ, USA, Jul. 7, 2008, XP031314533; pp. 1-2.
Chan et al., "Novel network architectures for survivable WDM passive optical networks," 34th European Conference on Optical Communication (2008), IEEE, Piscataway, NJ, USA, Sep. 21, 2008, XP031381168; pp. 1-4.
(Continued)

*Primary Examiner* — David Payne
*Assistant Examiner* — Casey Kretzer
(74) *Attorney, Agent, or Firm* — Amy M. Salmela; Patterson Thuente Pedersen, P.A.

(57) ABSTRACT

An optical line terminal for use in a multi-wavelength network to operatively connect via a PON port by a first connection to a first network node and to operatively connect via the PON port by a second connection to a second network node, the optical line terminal being configured to operate under first network conditions by sending no data via the second connection, and to operate under second network conditions by sending data via the second connection.

15 Claims, 14 Drawing Sheets

(52) U.S. Cl.
CPC ...... *H04J 14/0246* (2013.01); *H04J 14/0282* (2013.01); *H04J 14/0291* (2013.01)

(56) References Cited

U.S. PATENT DOCUMENTS

| | | | | |
|---|---|---|---|---|
| 2010/0098407 A1* | 4/2010 | Goswami | ............. | H04B 10/032 398/5 |
| 2011/0064410 A1* | 3/2011 | Beckett | .................. | H04J 14/02 398/63 |
| 2012/0251108 A1 | 10/2012 | Chen et al. | | |
| 2014/0321845 A1* | 10/2014 | Jiang | .................. | H04Q 11/0067 398/5 |
| 2016/0013864 A1 | 1/2016 | Rafel Porti et al. | | |

FOREIGN PATENT DOCUMENTS

| | | |
|---|---|---|
| MY | 140726 A | 1/2010 |
| WO | WO2009050459 A1 | 4/2009 |

OTHER PUBLICATIONS

Kwanil et al., "Protection architecture for colorless DWDM passive optical networks," Photonicsglobalsigmaingapore (2008), IEEE, Piscataway, NJ, USA, Dec. 8, 2008, XP 031423976; pp. 1-4.
International Search Report and Written Opinion, for PCT Application No. PCT/GB2014/000526, dated Mar. 6, 2015, 4 pages.
Mitsui et al., "Flexible and Scalable PON Protection Architecture using N:M Redundancy toward Next Generation Access Network", 2011 17$^{th}$ Asia-Pacific Conference on Communications (APCC), Oct. 2-5, 2011, 6 pages.

* cited by examiner

OPERATIONALLY RESILIENT OPTICAL NETWORK

RELATED APPLICATIONS

The present application is a National Phase entry of PCT Application No. PCT/GB2014/000526, filed on 24 Dec. 2014, which claims priority to EP Patent Application No. 13250134.7, filed on 31 Dec. 2013, which are hereby fully incorporated herein by reference.

TECHNICAL FIELD

The present disclosure relates to apparatus, configurations and methods for enhancing the operational resilience of optical communications networks, particularly but not limited to multi-wavelength optical network systems.

BACKGROUND

There are multiple technologies that can be used in the access network but as it is known, connection paths comprising more optical fiber (relative to copper) will typically yield greater data rates, so a network comprising fiber all the way to customer premises (FTTP) which may take the form of a passive optical network (PON) is the most preferred solution in terms of transmission capacities and speeds.

As demand for capacity of the fiber access networks increases, eventually multiple wavelengths are used between the access network head-end (OLT) and a remote terminal at some location near the customer premises depending on the type of FTTx system being used (e.g. FTTP, FTTC fiber to the cabinet, FTTDP fiber to the distribution point).

A schematic depiction of a conventional PON (10) is depicted in FIG. 1, in which an OLT (14) includes one or more core network linecards each of which has a plurality of core network optical ports, and one or more linecards (40) each of which has a plurality of optical PON line terminals or ports (typically 4, 8, or 16, also not shown). Data is transmitted to the customer end via a PON port or line terminal (LT) along a connection established over an optical distribution network (ODN) in the access network. This comprises a primary PON feeder fiber connection (34), an optical splitter (42) and a number of optical distribution fiber links (46) to an optical network unit (ONU) (also known as an optical network terminal ONT), which can be located at different points in the network close by or inside the customer premises (32). For ease of description, FIG. 1 depicts only one PON and the relevant section of the network, but it is known that an OLT can support many PON systems via multiple ODNs and serve many more ONUs.

Networks are susceptible to equipment or plant damage or failure and have limited resilience in the event of equipment or plant failure. The adverse effects can be made worse by the network branching architecture. For example, if the optical feeder fiber link (34) connecting the OLT to an optical splitter (42) is broken, or if a PON linecard serving multiple ONUs was to develop a fault, then all of the customers served by that PON port or the entire PON linecard will lose service. Thus, a problem with the OLT (14) could lead to a total loss of service, or at the least reduction in service quality, for all of the customers served by the affected OLT.

"Dual parenting" (also known as "dual homing") is a network design approach addressing the need to provide operational protection or resilience in optical networks in the event of loss of service to customers. Here, a customer is connected to head ends in two different exchange buildings to increase the resilience of the network.

WO2009/050459 describes a dual parenting implementation in which a PON is configured with two virtual local area network (VLAN) connections between a switch and the customer terminal, using two different communication paths provided by dual parenting. In operation, one of the VLAN connections is used to transmit traffic under "normal" network conditions and the other provides a back-up path in the event of problems (such as cable breaks, equipment malfunction, or damage or destruction of the exchange building housing the primary OLT) affecting operation of the first connection. For the purpose of this description, "normal" network conditions refers to the situation where the network or part thereof is operating as expected in the absence of damage, failure or faults affecting network plant and equipment affecting the network or section under consideration. The provision of redundancy in this way at the network layer and the service layer enables a faster customer reconnection in the event of network plant or equipment failure. In this document, this approach is also referred as "protecting" the network or providing it with operational resilience.

Another dual parented implementation is described in EP13250023.2, in which a dual parenting network topology is deployed in a fiber to the cabinet (FTTC) network, in which the cabinets are connected to the exchange via point-to-point optical fiber links. Here, the standby network has a point-to-multipoint layout.

Providing redundancy in this manner significantly increases the number of standby line cards, network plant and equipment needed and thus the overall cost of building the network.

Redundant plant and equipment are typically not used to their fullest extent, if at all, under normal network operation conditions until there is a need to switch operations away from the primary OLT. Failure events are rare occurrences and so significant capital and operation expense is incurred in providing a standby OLT and its associated PON ports.

Other protection schemes are known in the prior art, such as that described in US2012/0251108, which discloses an optical network comprising two multiplexer/demultiplexers (mux/demux), the first being comprised in an OLT, and the second forming a wavelength routed wavelength division multiplexed PON. The network further comprises working feeder fibers and protection backup feeder fibers connected to the mux/demux units comprising an N×N or 1×N arrayed wavelength gratings (AWGs). The output ports of the second mux/demux are allocated as a working path output port or a protection path output port depending on: an identity of a second mux/demux, an identity of the output port, an identity of a free spectral range (FSR) of the first mux/demux, the number of working fibers, the number of input ports of the first mux/demux, and an identity of the backup feeder fiber.

The problem is also addressed in "Flexible and scalable PON protection architecture using N:M redundancy toward next generation access network" (Mitsui T; NTT Access Network Service Syst. Labs, NTT Corp, Yokosuka Japan; Sakamoto T; Hara K; Yoshimoto N, The 17th Asia-Pacific Conference on Communication, 2011), which describes a system having an optical switch between the splitters situated between the ONUs and the OLTs. If one of the OLTs fails, the fibers directed to the failed OLT are switched to another OLT, using an optical switch in order to implement an N:M protection (i.e. N PONs protected by M OLT ports). This application is restricted to use in FTTC networks only, where there is already an active element in the field, i.e. the DSLAM. The idea is not usable in the FTTP technology where the fiber plant and equipment is passive. It is also not suited for use in a dual parenting resilience scheme where the working and protecting OLT's are sited in remote locations.

Yet further approaches seek to protect the fibers between the remote node and the ONUs in specific configurations, such as those described in US2006104638 and MY140726.

SUMMARY

None of the above approaches addresses the need for provision of operational resilience in an optical network in a way which reduces in number the required expensive protection PON LTs, while protecting an entire OLT against failure events (not just some of the elements) and for deployment across a range of FTTx architectures. Additionally, it would be advantageous to be able to achieve this regardless of whether the remote (or branching) node is a wavelength splitter (AWG) a power splitter, or a combination of the two. Network designers and operators would also find the ability to configure M number of OLT PON LTs to protect N number of working OLT PON LTs to be useful.

It would be desirable to realize solutions which enable the above, and also to improve upon, or overcome the problems raised by, known approaches.

According to a first aspect, there is provided an optical line terminal for use in a multi-wavelength network to operatively connect via a PON port by a first connection to a first network node and to operatively connect via the PON port by a second connection to a second network node, the optical line terminal being configured to operate under first network conditions by sending no data via the second connection, and to operate under second network conditions by sending data via the second connection.

As noted above, a linecard for transmitting to the customer end via the access or distribution network is provided in an OLT. Embodiments of the invention provide that the PON port can be used to support the operation of more than one remote node. For example, the first node (and its associated ODN if any) can be connected to the OLT via the PON port to receive the usual communications service from an OLT under normal network conditions. The OLT is also connected via the same PON port to provide standby operational support to one or more further network nodes (which are operatively connected to another OLT unit or LT), so that in the event of failure of the primary link which normally connects the node or network, traffic can be directed to the standby system supported via the PON port. Here, the first network conditions refer to the normal operation of the working link which provides normal service to a node, and the second network conditions are when the primary link fails (thus requiring a switch over of traffic to the standby unit), although the skilled person would appreciate that other network condition changes (i.e. not necessarily referring to link failures) could be possible.

Under normal network working conditions therefore, no data is sent from the OLT to the node via the PON standby connection as this is not required. It may however be that data may is received in which case it is treated as crosstalk, which will be discussed further below. When the network conditions change however, data is transmitted over the standby link in both directions, i.e., both upstream and downstream.

In one embodiment, the PON port comprises an AWG routing element which allows it to provide operational support for more than one node or network. In other advantageous embodiments, filters of various kinds are included to deal with the issue of crosstalk, as well as to help deal with capacity issues in the event of operations under the second network conditions during which a network's service via its normal primary link is compromised.

According to a second aspect, there is provided a multi-wavelength communications network comprising an optical line terminal as disclosed, a first network node operatively connected to the optical line terminal by a first connection via a PON port, a second network node operatively connected to the optical line terminal by a second connection via the PON port, the second network node being also operatively connected by a third connection to a second PON port, wherein the optical line terminal operates under first network conditions by sending no data via the second connection, and operates under second network conditions when the third connection fails, by sending data via the second connection.

The node which is supported for resilience, as noted above, is operationally connected for its normal service via a working connection under first network conditions. When this working connection fails or develops a fault, the standby connection via the PON port or LT is activated.

Embodiments can be deployed to advantage in various network architectures, such as a point-to-point or point-to-multipoint networks to provide "N:1" protection, which as described below refers to the standby support provided by a single PON LT for more than one node or network. While N could be 1 (i.e. a 1:1 network configuration so that the PON port protects only one network), greater advantages can be realized in supporting multiple networks by the one PON port. In various implementations, a number of PON ports each supporting a number of networks (whether as working links, or standby connections) are provided.

In a further application, a dual parented network architecture (as will be described below) can be used to provide even greater resilience against events which might affect the general geographic area in which a PON port or the OLT which houses it.

According to a third aspect, there is provided a method of operating a multi-wavelength communications network comprising an optical line terminal as disclosed, a first network node operatively connected to the optical line terminal by a first connection via a PON port, a second network node operatively connected to the optical line terminal by a second connection via the PON port, the second network node being also operatively connected by a third connection to a second PON port, comprising: sending no data to the second network node via the second connection under first network conditions, and sending data to the second network node via the second connection under second network conditions when the third connection fails.

BRIEF DESCRIPTION OF THE DRAWINGS

Embodiments of the present invention will now be described, by way of example only, with reference to the accompanying drawings in which.

DETAILED DESCRIPTION

Figure 1:
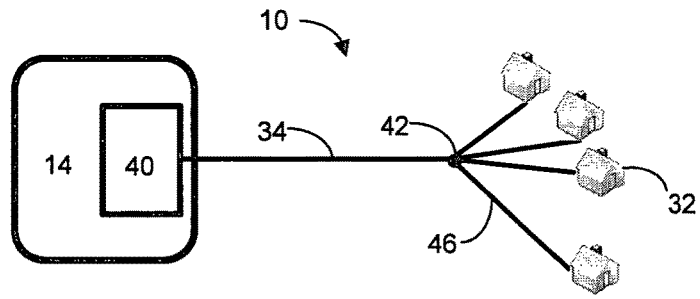
FIG. 1 depicts components of a PON.
Figure 2:
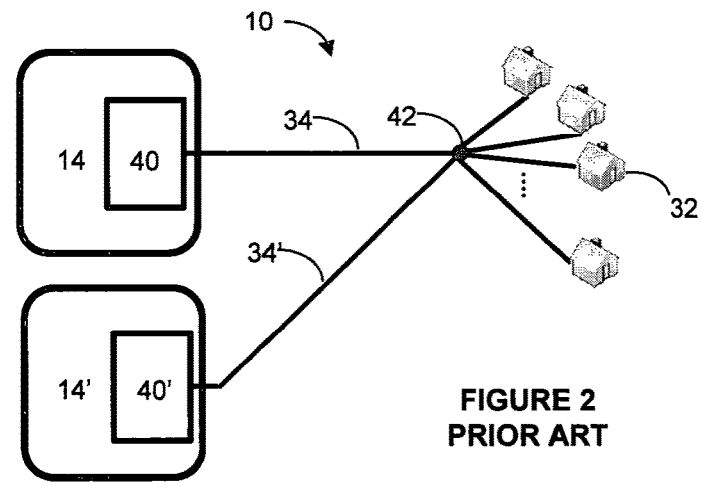
FIG. 2 depicts a resilient PON with a standby OLT.

A known dual parented FTTx PON such as that shown in FIG. 2 is protected using a "1:1 scheme", referring to the support of one PON (10) by one standby feeder fiber (34') and OLT line port for operational resilience. Two linecards in one PON are used—one (40) for "normal" operation and a second (40') for resilience. In the configuration shown in FIG. 2, the linecards are deployed in separately located OLTs (14, 14') via two separate PON feeder links (34, 34'). As discussed above, the secondary or standby OLT/linecard (14'/40') is operationally ready to take over the provision of service to the end customers in the event of failure of the primary linecard (40), OLT (14) and/or link (34). Until the standby elements are called into service however, they remain inactive for service traffic.

There now follows descriptions of a number of approaches which can reduce the cost and improve the efficiency of providing operational resilience to an optical network.

Figure 3:
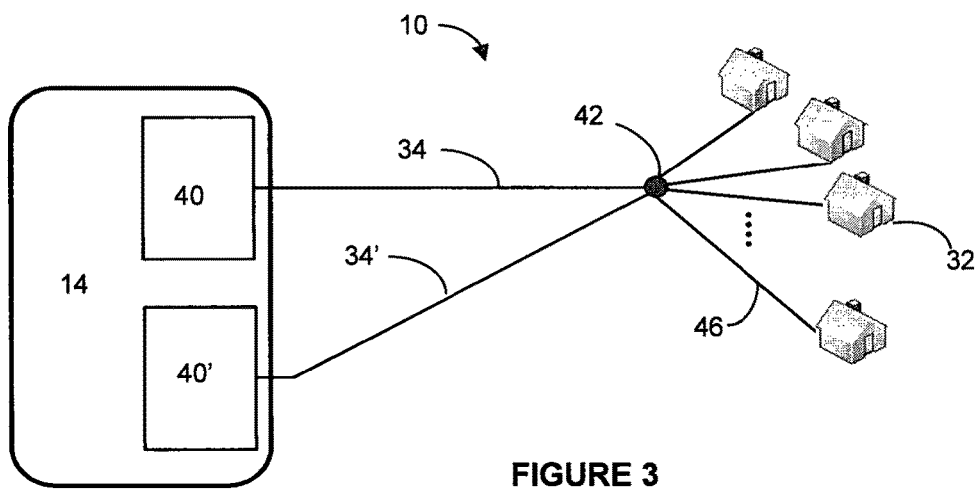
FIG. 3 depicts a resilient PON with a single OLT with multiple line cards.

FIG. 3 depicts another PON configuration with a 1:1 scheme comprising a single OLT (14) which provides "normal service", but also operational resilience against failure of the primary plant and equipment. This architecture contrasts with the known approach of providing linecards in two separate OLTs shown in FIG. 2. Here, the standby linecard (40') is located within the housing or chassis of the single OLT, and separately linked (34') to the customers (32) via a branching element such as an optical power splitter (42) to connect the two linecards to the ONUs and end customers. In comparison with the known resilient dual-parented PON discussed above in respect of FIG. 2, this "single parented" arrangement saves on the need for a separate OLT (14' in FIG. 2). This approach gives resilience to failures of the primary linecard (40) and the feeder fiber (34), by providing that operations can switch over to the standby linecard and link. However, the PON is vulnerable in the event of damage to the OLT which houses both the primary and the standby linecards, and/or to the exchange building in which the OLT is located.

Figure 4:
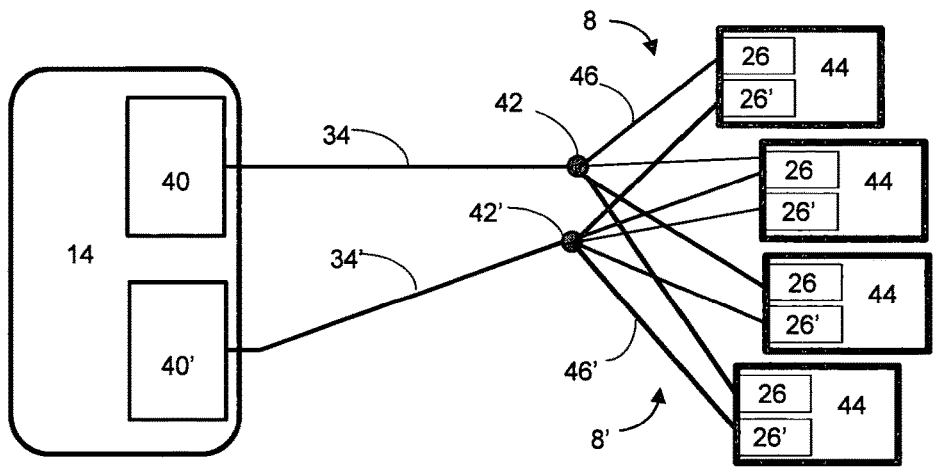
FIG. 4 depicts a resilient PON with multiple ODNs.

FIG. 4 shows an enhancement of the PON described above in connection with FIG. 3.

This layout includes a second, standby, ODN (8') which includes a second branching element (42'). In this 1:1 configuration, a working connection is formed between a linecard (40) in the primary OLT (14) and an optical terminal or port (26) in the ONU (44) during normal network conditions via the primary ODN (8) which comprises the main feeder fiber (34) and distribution fiber links (46) to the primary splitter node (42). The backup ODN (8') configuration mirrors the primary network, consisting of a standby feeder fiber (34'), and distribution fiber links (46') between the standby splitter node (42') and a standby optical terminal (26') in the ONU (44) which is connected to the standby OLT linecard (40'). In this way, each ONU is protected in the event of failure of the primary OLT linecard (40), primary feeder fiber (34), primary splitter node (42), primary distribution fiber link (46) or the primary ONU optical terminal (26). In the implantation shown in FIG. 4, the standby linecard (40') is co-located with the primary linecard (40) in a single OLT in a single parented configuration. For added resilience, the standby linecard can be deployed in a dual parented arrangement where the separate OLT is located remotely from the primary OLT and preferably in a separate exchange where from the primary OLT is housed.

Figure 5:
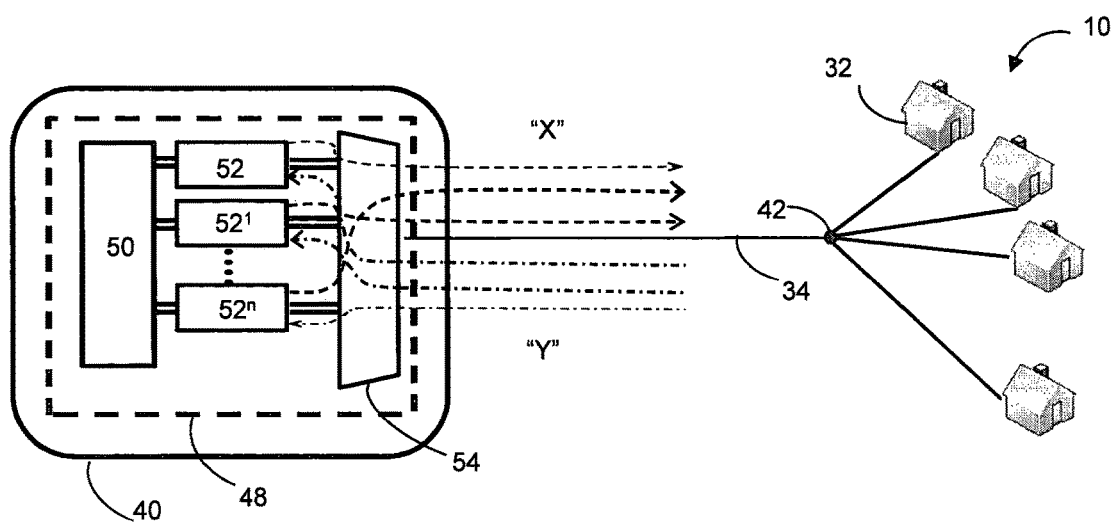
FIG. 5 depicts components of a multi-wavelength PON.

As noted above, multiple wavelengths techniques are deployed in the access network to realize greater transmission capacities and speeds. A multi-wavelength PON (MW-PON) uses multiple wavelengths to communicate between the OLT at the head end and a number of ONUs at the remote or customer end. As shown in FIG. 5, the main components of a line card (40) located in an OLT comprises typically 2 to 4 LTs or PON ports (48), of which only one is shown in the drawing for clarity. This includes a media access control (MAC) unit (50), a number of transceivers ($52, 52^1, \ldots 52^n$), and a mux/demux (54) element. In operation, all the wavelengths are multiplexed at the OLT downstream (arrows "X") onto the PON feeder fiber (34), and are demultiplexed upstream (arrows "Y") from the PON fiber onto the OLT receivers (52). The PON branching element (42) of a MW-PON can be an optical power splitter, a wavelength splitter, or a combination of both. The implementations discussed here refer to use of an optical power splitter, but other embodiments and applications of the invention can be configured using other PON branching element types.

Figure 6:
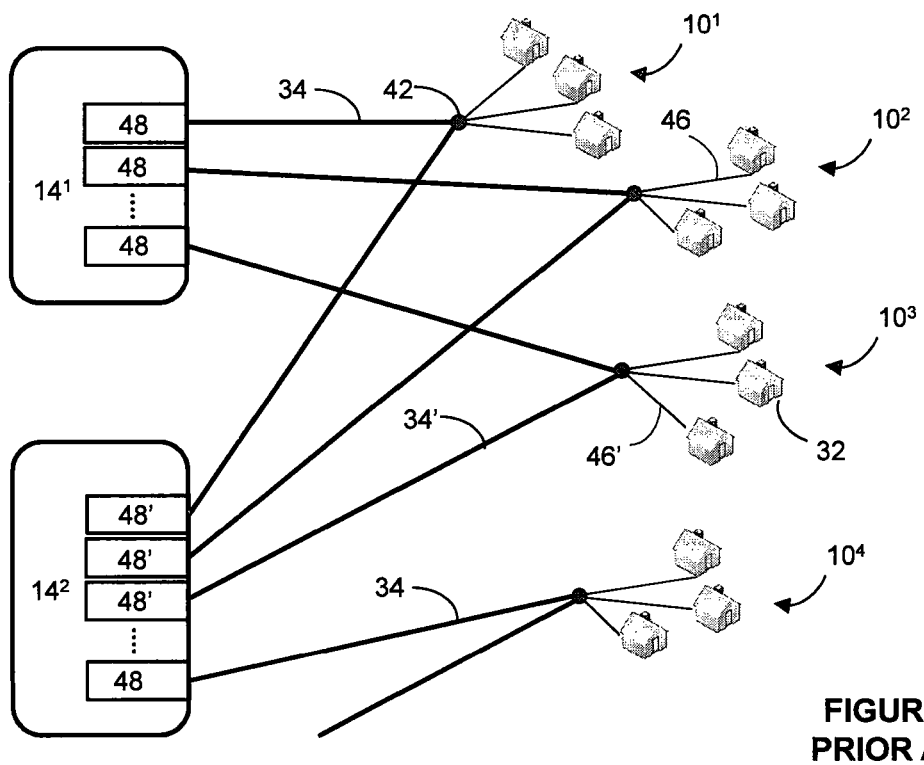
FIG. 6 depicts a resilient PON with a standby OLT.

FIG. 6 depicts an exemplary layout of a dual parented 1:1 protection scheme which may be deployed in a MW-PON. The optical network here comprises two OLTs ($14^1, 14^2$), each comprising one or more linecards each of which have a number of LTs (48). Each LT is optically linked to four splitter nodes (42) serving a number of ONUs at the customer end in four PONs ($10^1, 10^2, 10^3, 10^4$). Some of the LTs (48) provide service to the remote end under normal conditions, while others (48') are on standby. Normal service LTs (48) are not all necessarily located in the same OLT: for example the last PON port (48) in the second OLT ($14^2$) provides normal service to the fourth PON ($10^4$). In this way, each PON is protected via a backup feeder link (34') between its splitter node and a standby linecard (48') in a 1:1 configuration.

Figure 7:
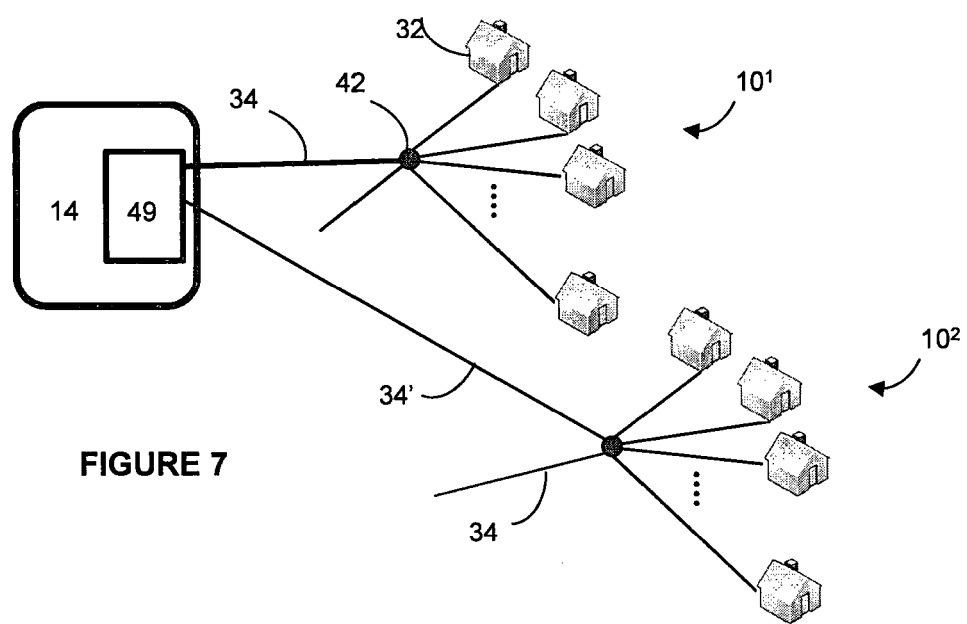
FIG. 7 depicts an implementation of a resilient PON.

FIG. 7 depicts an exemplary implementation of a single parented multi-wavelength optical network according to the invention. Here, a single LT located in an OLT (14) is optically connected to at least two PONs ($10^1, 10^2$), so that in contrast with the previously described 1:1 network configurations, one linecard port provides active service to a first PON via a primary feeder fiber (34), as well as standby services to another PON via a standby connection (34') in an N:1 arrangement. In implementations of the invention, this is realized by using an N×N routing component (55) (with N input ports and N output ports) in place of the conventional mux/demux element located in the LT. An LT of such a configuration (49) is depicted in FIG. 7. Preferably, this routing element is a cyclic passive router which avoids the need for two separate devices (one for multiplexing and one for demultiplexing) although two asymmetric devices (such as wavelength grating routers) may be used in a mux/demux arrangement to separately deal with upstream and downstream traffic, especially where only a small number of wavelength (say 4 to 6) are involved. Advantageously, the routing unit is an AWG router which can be used with a higher number of wavelengths. AWGs are typically used to carry signals of different frequencies on one optical fiber, and conventionally serve to increase the capacity of a given fiber, or to load-balance traffic in a network. Specific AWG-based implementations of the invention to provide a protected optical network will be described in detail further below.

Turning back to the N:1 network arrangement shown in FIG. 7, it can be seen that one LT (49) serves two PONs in a 2:1 configuration. This architecture contrasts favorably with the 1:1 approach by doing away with the need to provide duplicate backup plant and equipment, resulting in significant operational efficiencies and cost advantages. Specifically, an expensive PON port that otherwise would have to be used for only standby purposes can now be used more fully, either in full active mode serving a PON, or in an extended role in which it serves to back up the operation of further PONs.

Figure 8:
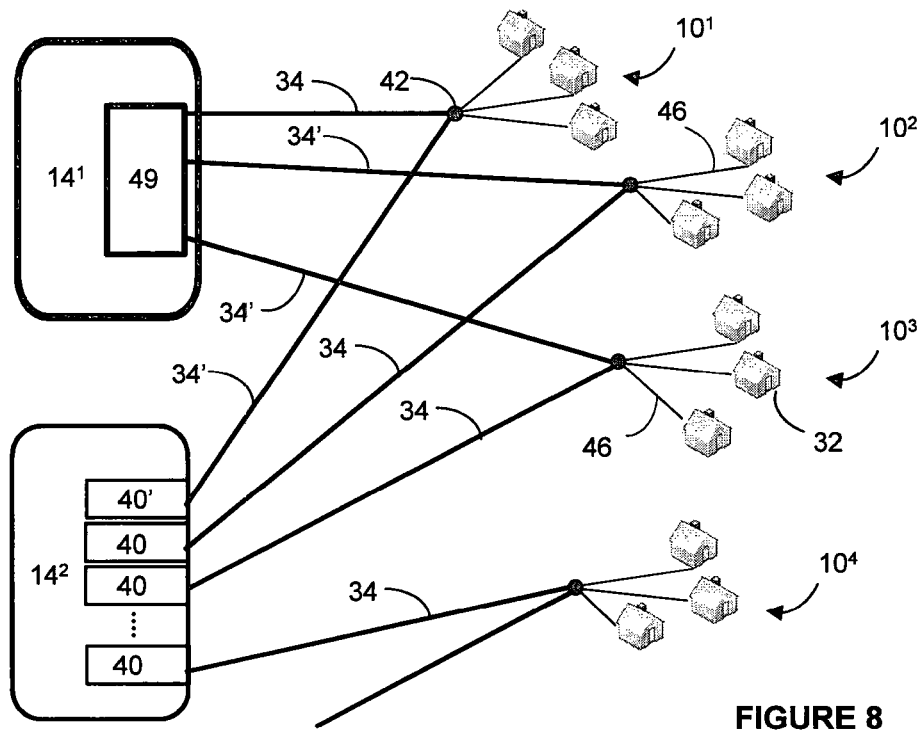
FIG. 8 depicts a dual parented implementation of a resilient PON.

In contrast with the single parented layout of FIG. 7, FIG. 8 depicts an exemplary dual parented network. This comprises four MW-PONs PONS ($10^1$, $10^2$, $10^3$, $10^4$), in which one OLT ($14^1$) is configured in accordance with the invention so that the one LT (49) comprises an AWG. The OLT is connected via the one LT to provide full service under normal conditions to a first PON ($10^1$) via a primary fiber link (34), while serving as a backup for two other PONS ($10^2$, $10^3$) via secondary, backup, fiber links (34'). In this example, the ratio of LTs to connected networks for this OLT ($14^1$) is 3:1. For contrast, the second OLT ($14^2$) has a 1:1 configuration, and acts as a backup system to PON (10 by the arrangement of separate standby connections (34') to separate standby line cards (40') each via a separate PON port. Three of the linecards (40) provide the second, third and fourth PON ($10^2$, $10^3$, and $40^4$) with active normal service via a primary connection (34).

The skilled person would appreciate that yet further applications can be envisaged within the scope of the disclosure, including use of the approaches of the disclosure in the core network in addition to the currently-discussed implementations in the access or distribution network, to realize the same or similar advantages.

Figure 9:
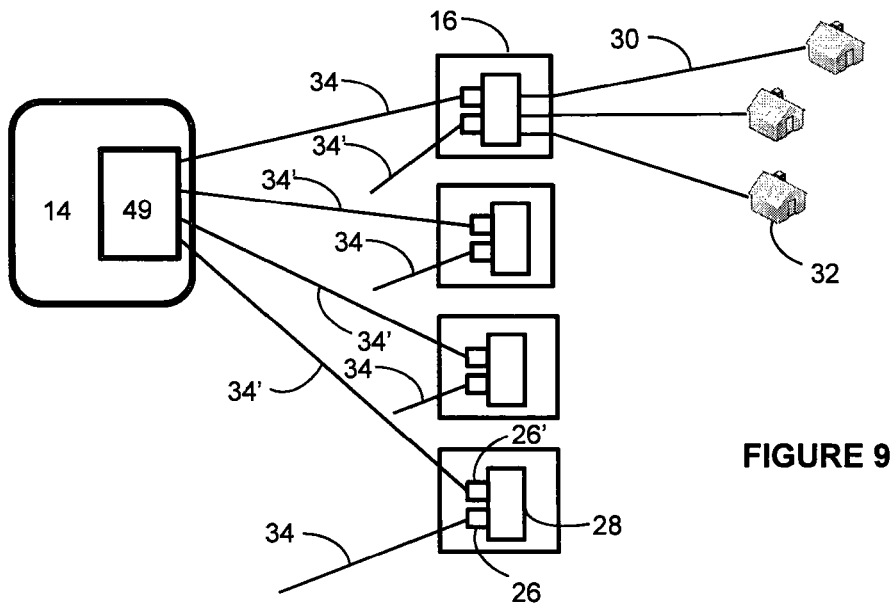
FIG. 9 depicts an implementation of a resilient FTTC network.

An example of such an implementation is shown in FIG. 9. Here, a multiple wavelength optical network configuration in the form of an FTTC network comprises point-to-point links (34, 34') between nodes in the form of cabinets (16) and the OLT (14) having an LT (49) which includes an AWG. In this 4:1 configuration, a single LT supports the normal operation of the first cabinet located at the top of the drawing linked (34) to the OLT (14), and provides operational resilience to remaining three cabinets.

As noted above, implantations of embodiments require use of an N×N routing component replacing the conventional mux/demux element in the PON LT. The following will now describe the operation of an OLT comprising such a router (55) which in this description takes the form of a cyclic AWG router in various exemplary implementations.

Figure 10A:
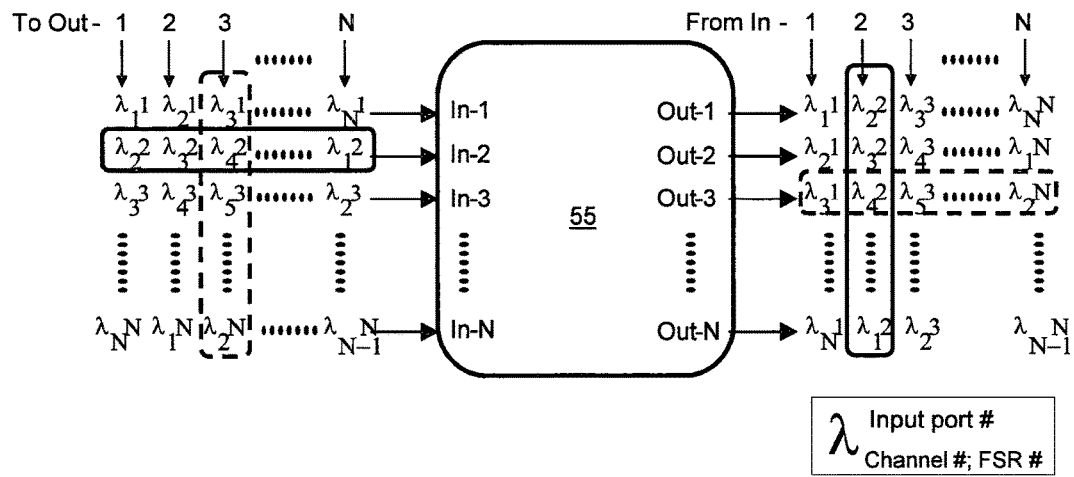
FIG. 10A illustrates the operation of a cyclic AWG router within one wavelength band.

FIG. 10A illustrates the routing operations of a cyclic N×N AWG (55) which comprises N input ports and N output ports. Data traffic over different wavelength channels travel through the AWG router from left to right in a downstream direction as shown by the arrows (as well as in an upstream direction, not shown). In the figure, each signal λ is identified by reference to the input AWG port, channel number and free spectral range (FSR) using the following convention:

$$\lambda^{Input\ port}_{Channel\ \#;\ FSR}$$

In cyclic routing, each channel is routed through the AWG according to its wavelength channel number within the band regardless of its specific FSR. As shown, traffic entering through Input Port 2 of the AWG over the different wavelength channels ($\lambda_2^2 \lambda_3^2 \lambda_4^2 \ldots \lambda_1^2$ as encircled by the solid line on the left hand side of FIG. 10A) is output respectively to each output port 1, 2, 3, ... N also encircled by the solid line on the right hand side of FIG. 10A.

Figure 10B:
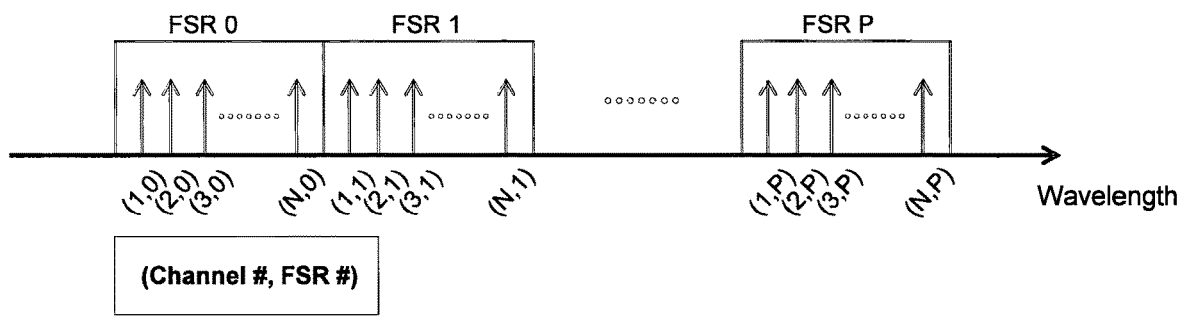
FIG. 10B illustrates a possible wavelength spectrum division in bands as used by the specific AWG of FIG. 10A.

Conversely, the traffic entering over the different AWG ports (e.g. wavelength channels $\lambda_3^1 \lambda_4^2 \lambda_5^3 \ldots \lambda_2^N$ as encircled by the dotted line on the left hand side of FIG. 10A) respectively into each input AWG port, is all output from port 3 (also encircled by a dotted line on the right hand side of FIG. 10A). FIG. 10B is an FSR diagram showing P wavelength bands, in which each band having N channels, each channel being identified by the convention:

(Channel #, FSR #)

Note that in each fiber spectrum band (FSR), the channel spacing in Hertz or nanometers is slightly different depending on device manufacturing specification.

The routing characteristics of a cyclic AWG as shown in FIG. 10A are symmetrical and the wavelength channels illustrated on both sides of the device would also be true if the direction of the traffic were from right to left, where the input and output ports would respectively be the output and input orts.

Figure 11A:
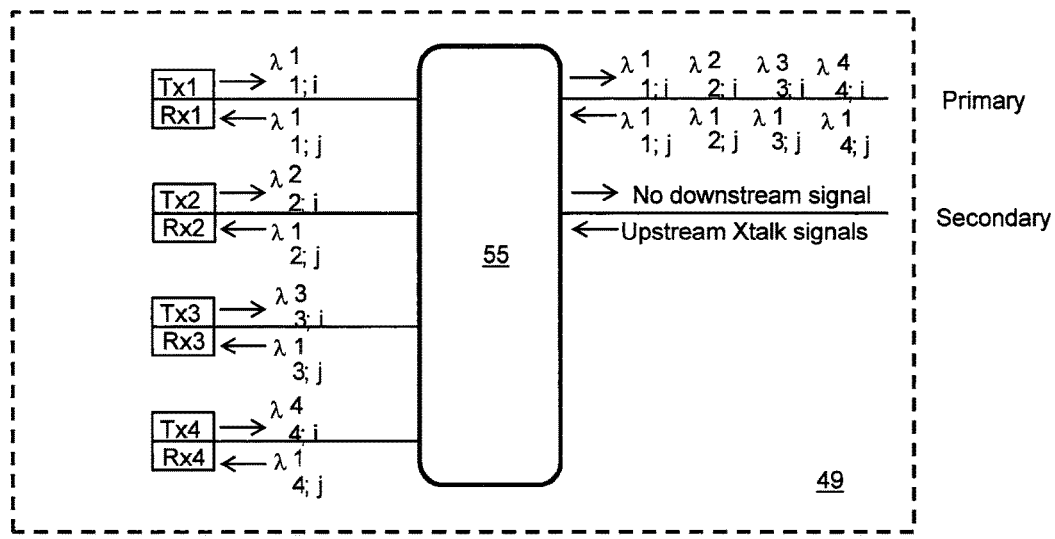
FIGS. 11A and 11B depict the operation of a 4×2 cyclic AWG router.
Figure 11B:
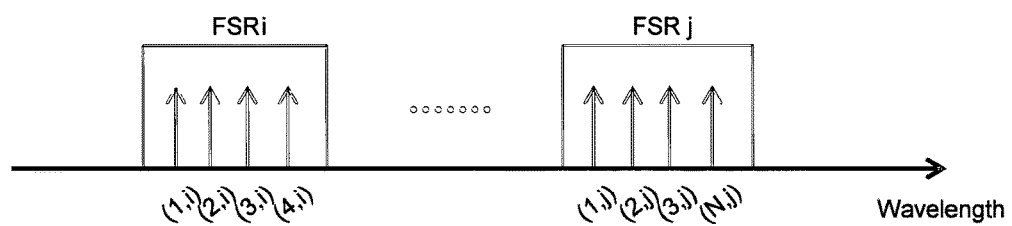

FIGS. 11A and 11B describe the operation of a cyclic AWG (55) of an LT (49) in an exemplary implementation of the invention operating a protection configuration which can be used with a network such as that discussed above in connection with FIG. 7. As noted above, the LT is located on a linecard of an OLT. Here, four transceivers (Tx1/Rx1 ... Tx4/Rx4) are in optical communication via the AWG input ports, and two fiber connections connected to the output ports. The AWG is operating in 4×2 mode. Using the reference numbers of FIG. 7, one of the connections is primary fiber (34) for normal operation with a first PON (10') and the second is a secondary, standby, fiber (34') supporting a second PON ($10^2$). The network here has a 2:1 configuration as one PON port or LT supports the two fiber connections.

Figure 12A:
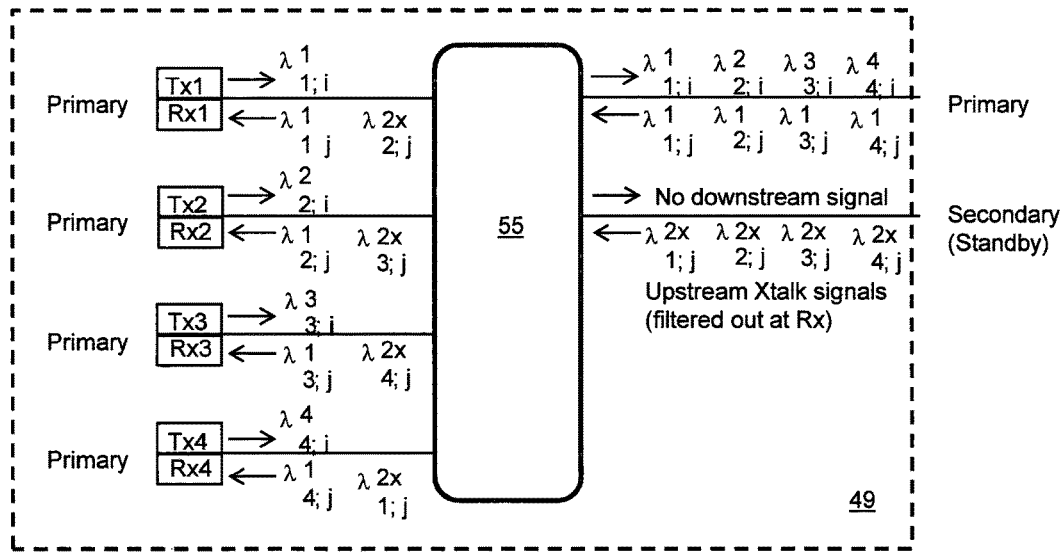
FIGS. 12A and 12B depict crosstalk received at a 4×2 cyclic AWG router.
Figure 12B:
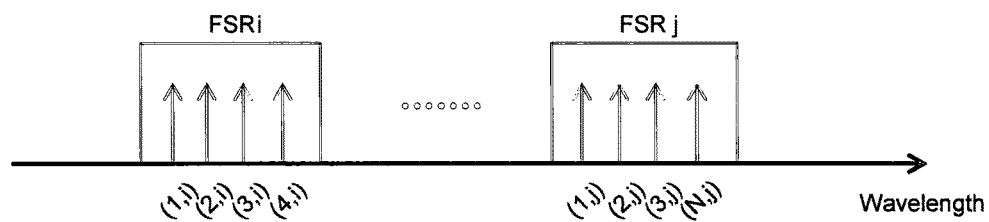

FIG. 11A illustrates the process by which the wavelengths are routed through the AWG during normal operating conditions, during which downstream and upstream data of various wavelength channels are respectively sent from, and received at, the LT from the primary connection to the transceivers via the router. Specifically, the cyclic router multiplexes the data from the transmission units of the transceiver onto only the primary line in a downstream direction to the customer end, and demultiplexes data received from the primary connection for onward transmission to the tuneable receiver element of the transceiver in the upstream direction. Meanwhile, the secondary link to a different network is inactive (save in respect of the receipt of crosstalk signals, which will be discussed below), so AWG in this state is entirely devoted to multiplexing and demultiplexing traffic on the primary connection. FIG. 11B correspondingly depicts the two wavelength bands used by the 4×2 cyclic AWG router in FIG. 11A, FSR 'i' for the downstream direction and FSR 'j' for the upstream direction, both used under normal operation conditions, During normal operation (i.e. when the secondary fiber is inactive) unwanted data signals transmit upstream to the LT through the secondary fiber although it is in a standby state and supposedly inactive. Such unwanted signals are dealt with as crosstalk, for which tuneable filters can be provided in the receivers in a preferred implementation of the invention to selectively filter out the crosstalk signals. This process is illustrated in FIGS. 12A and 12A, which depicts crosstalk data arriving as upstream signals on the secondary fiber at the AWG router. The router demultiplexes the signals on towards each of the receiver units in the four transceivers. The inclusion of the filters at the transceivers helps to exclude them from progressing any further in the upstream direction. FIG. 12B depicts the corresponding FSR diagram for the operation of the system discussed above in relation to FIG. 12A, which is identical to that shown in FIG. 11B.

Figure 13A:
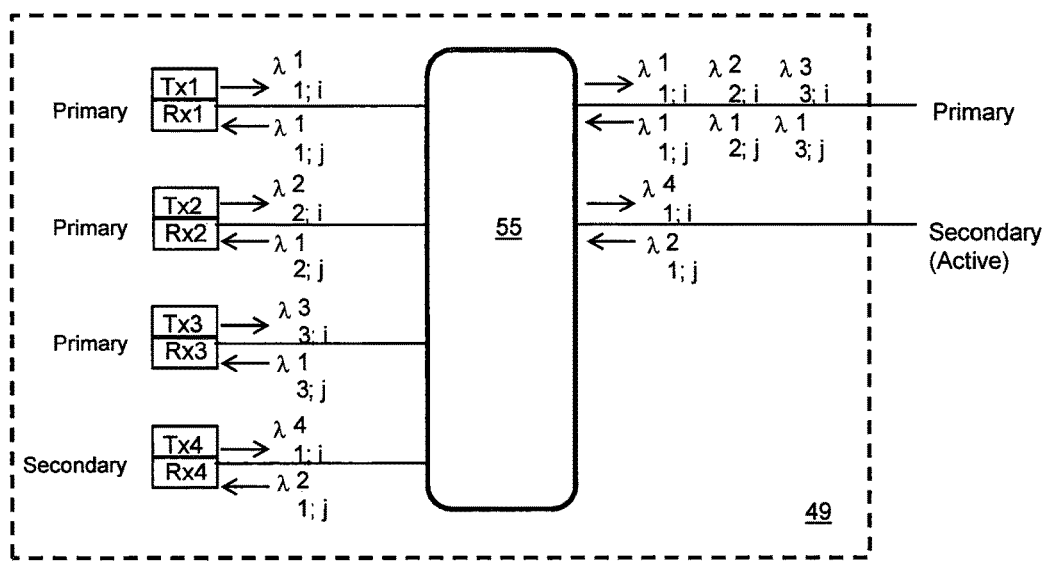
FIGS. 13A and 13B depict operation of a 4×2 cyclic AWG router under network failure conditions.
Figure 13B:
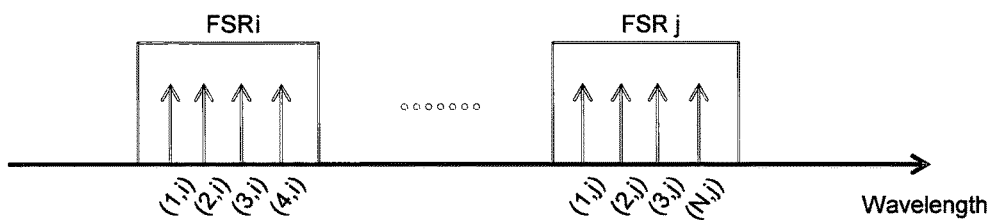

FIGS. 13A and 13B depict the process which the 2:1 protected network (discussed above in connection with FIGS. 11A and 12A) goes through when the second network backed up by the secondary fiber is failed by its primary connection (not shown). In this case, the secondary connection becomes active and the AWG starts communicating on both lines. In certain implementations, this can be automatically triggered by detection of the failure event.

Traffic to and from the protected second PON or network will now need to be processed by the same number of transceivers. While it is possible for all the traffic from both PON feeders to be distributed equally to all the transceivers, the increase in traffic may adversely affect the service to the customer of the primary connection especially if the PON port is running at or near capacity under normal conditions, or if the level of secondary traffic is very high. In this case, it may be decided by the network designer and/or operator to direct dedicate the additional traffic from the secondary fiber to be handled by just one transceiver (in FIG. 13A, this is the bottom-most unit), leaving the other three free to continue handling traffic from the primary fiber. Typically there should be sufficient capacity to handle the additional traffic so that end customers continue to get a service even if speeds may be compromised. However, optimization techniques to maintain or enhance capacity and speed during failure events will be described below.

Figure 14A:
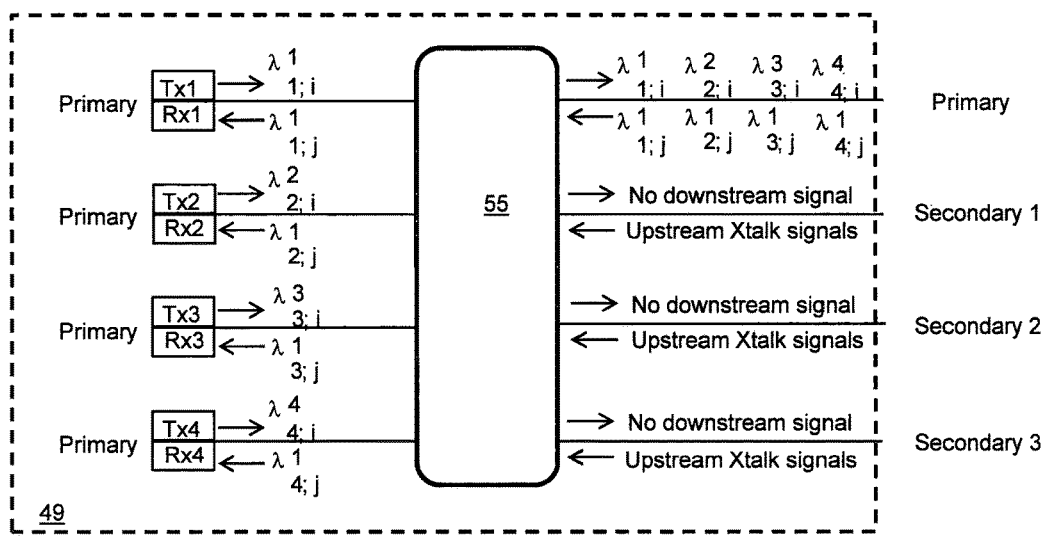
FIGS. 14A and 14B depict the operation of a 4×4 cyclic AWG router under normal network conditions.
Figure 14B:
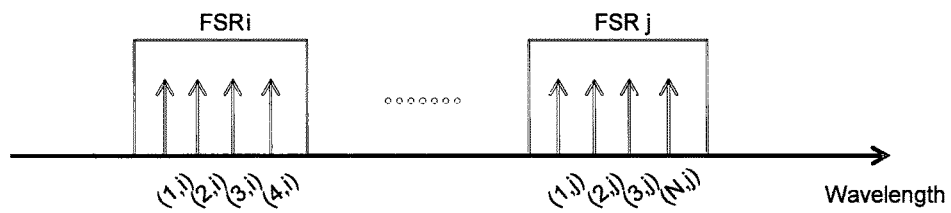

FIGS. 14A and 14B illustrate that operation of a network with a 4:1 protection configuration operating under normal network conditions, which can be used in a network layout such as that set out in FIG. 9. Here, an LT serves a primary fiber of a first network and provides resilience for three further networks by use of a 4×4 cyclic AWG router (55) in the OLT (49). As shown, data is being sent and received only over the primary feeder fiber. Under normal conditions, no data is sent downstream on the secondary fibers, although there may be crosstalk in the upstream direction. As was the case in the 2:1 network discussed above in connection with FIG. 12A, a tuneable filter can be provided in an advantageous implementation to remove the unwanted signals.

Figure 15A:
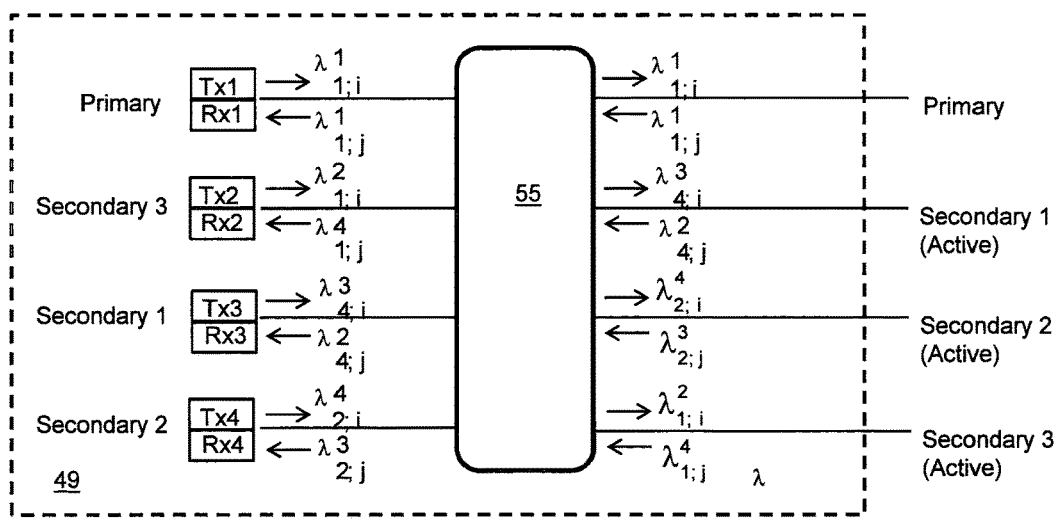
FIGS. 15A and 15B depict operation of a 4×4 cyclic AWG router under network failure conditions.
Figure 15B:
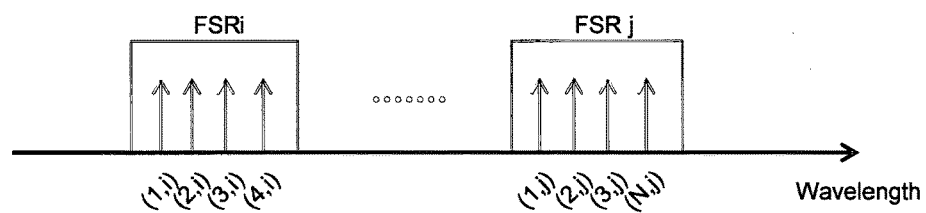

FIGS. 15A and 15B depict the 4:1 network in a condition of a network failure affecting all three of the supported networks connected to the LT via secondary fibers, an event which may occur if the three supported networks are located in geographic proximity with each other, or else share plant or equipment nearer the OLT end which has been damaged or has failed. In other circumstances, it is possible for, e.g., only the one or two of the three supported networks shown in FIG. 14A to become active, possibly with different start and end times and potentially overlapping in time. In the scenario shown in FIG. 15A, data traffic starts to arrive at the AWG (55) upon activation of the three secondary links. In comparison with the 2:1 network discussed in connection with FIG. 13A, there is potentially twice as much traffic to be handled over all four active links, while the number of transceivers available to deal with the traffic remains unchanged. In such a set-up, transceivers previously handling only traffic from the primary network, can be reconfigured to deal with traffic from the now-active secondary fibers as shown in the diagram. As shown, three transceivers may be given over to handling traffic sent and received over the secondary fibers under abnormal conditions, leaving just one transceiver to process data sent and received over the primary fiber.

As might be expected, the performance of the primary fiber operating under normal network conditions may degrade significantly upon the activation of the secondary lines, especially in the case when all the secondary fibers become active at the same time in a LT such as that depicted in FIG. 15A. A number of responses may be made to help recover capacity for the primary fiber in particular such as using additional FSRs and dedicated transceivers within the OLT configuration, will now be discussed.

Figure 16A:
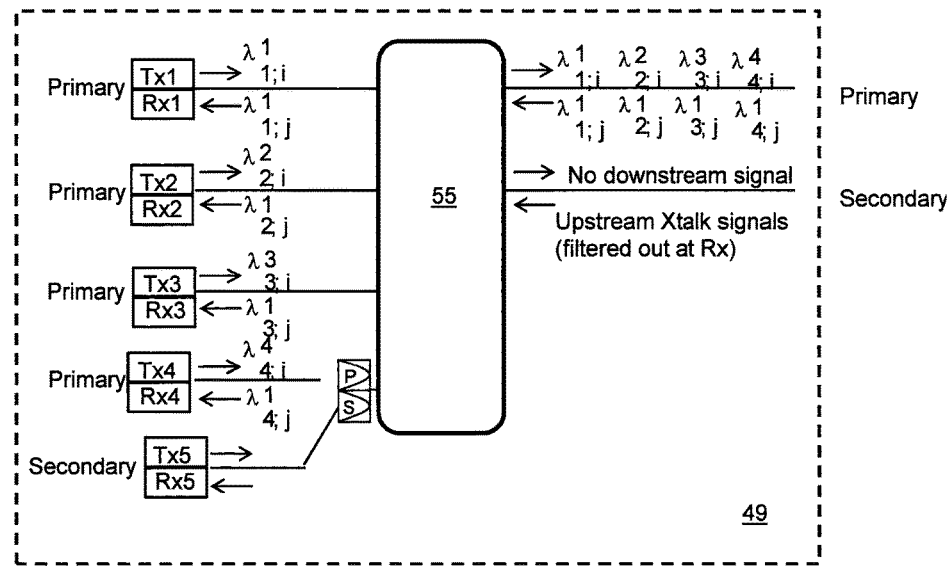
FIGS. 16A and 16B depict the operation of a 4×2 cyclic AWG router with filters under normal network conditions.
Figure 16B:
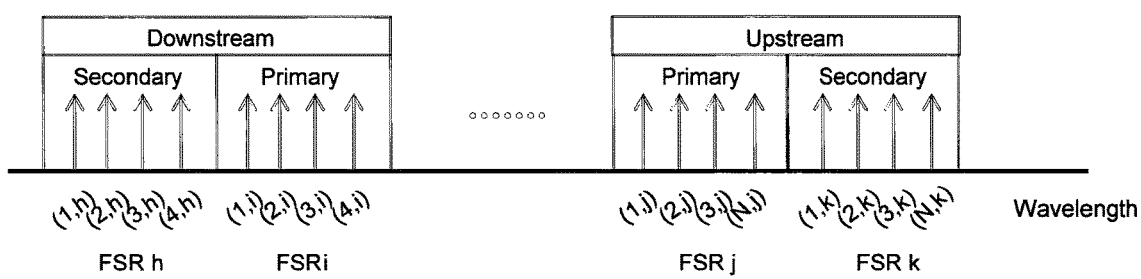

FIGS. 16A and 16B depict the operation of a re-configuration of the LT of FIG. 12A which deal with the issue of reduce bandwidth and capacity for traffic on the primary feeder fiber, in the event that one or more secondary fibers become active. FIG. 16A shows the LT in normal operations so that only the primary fiber is carrying data to and from the AWG. Here, an extra transceiver (Tx5/Rx5) has been added to the set up, so that in the event that failed network conditions affect one or more of the supported networks connected by the secondary fiber, traffic on the primary connection can continue to be dealt with by four transceivers without a significant speed drop.

To separate the primary data traffic from the secondary data traffic, a band-pass filter (depicted in FIG. 16A as component P/S) is deployed so that primary data traffic can be directed to a transceiver (Tx4/Rx4), while any traffic to and from a secondary link if and when this arrives, will be tapped off to a dedicated secondary transceiver (Tx5/Rx5). In this way, traffic to and from that standby fiber is handled exclusively or mainly by the extra secondary transceiver. This arrangement throttles the rate of traffic to and from the problematic network, while maintaining the performance of the primary, non-problematic network. This approach allows the stricken network(s) to continue to have some service even as the fault is being repaired, while making sure that the network served by the primary connection is not penalized for events which do not concern it. This approach can be compared with the configuration shown in, e.g., FIG. 15A where most of the available transceivers were flooded with secondary traffic, so that only one transceiver was left to handle traffic to and from the primary link.

Figure 17A:
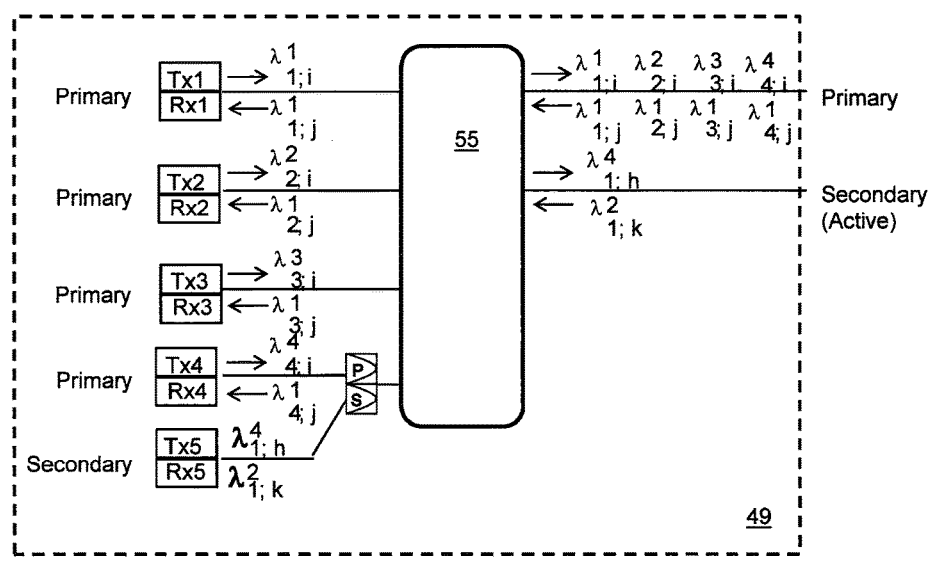
FIGS. 17A and 17B depict the operation of a 4×2 cyclic AWG router with filters under network failure conditions.
Figure 17B:
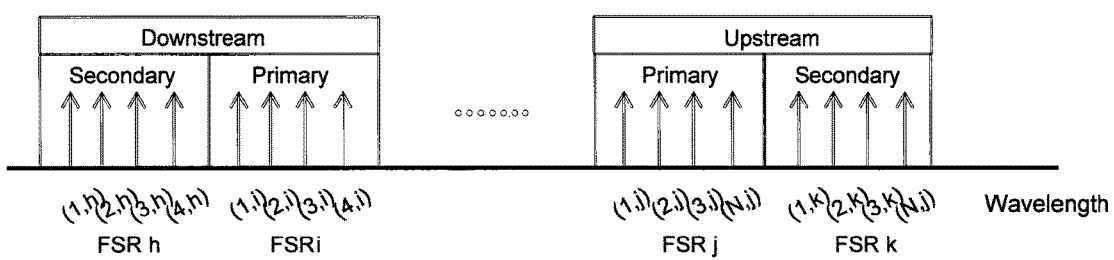

The FSR diagram depicted in FIG. 16B shows how wave bands h and k are reserved to deal with traffic on the secondary fiber(s) if and when a failure event occurs, leaving the other two to deal with traffic on the primary fiber. The operation of the system in such an event is shown in FIGS. 17A and 17B. The upper four transceivers continue to deal with traffic to and from the primary feeder fiber, while the secondary connection traffic is filtered through to only the specific transceiver at the bottom of the configuration. Also as previously mentioned, activation of a secondary fiber is (or should be) a rare occurrence, and the configuration depicted in FIG. 17A seeks to optimize the performance and capacity available to the primary fiber in anticipation that normal operating conditions should far exceed abnormal network conditions stemming from equipment faults or failures, accidents, cable theft, or the like.

Figure 18A:
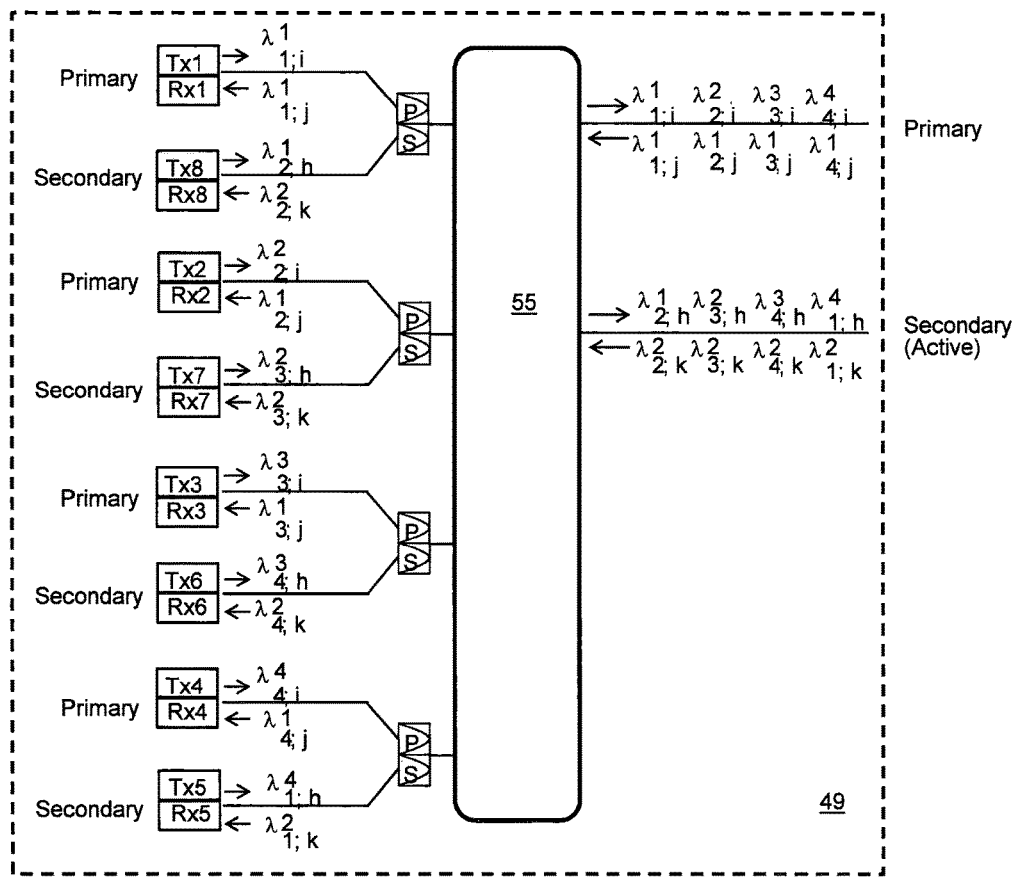
FIGS. 18A and 18B depict the operation of a 4×2 cyclic AWG router with multiple filters under network failure conditions.
Figure 18B:
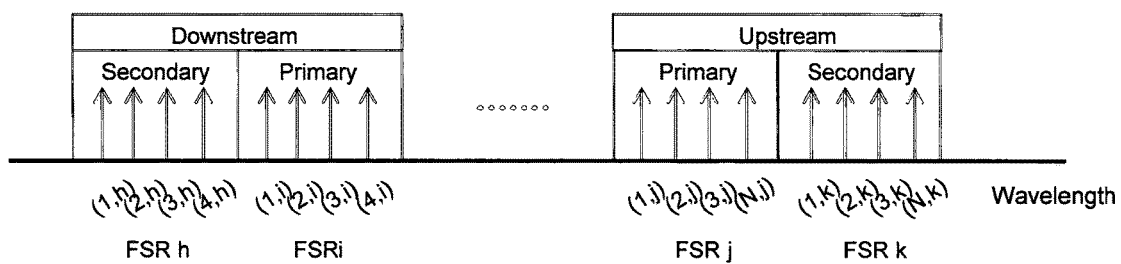

FIGS. 18A and 18B depict a more complex LT configuration in a 2:1 protection arrangement wherein each of the four transceivers have been provided a band-pass filter for isolating primary traffic from secondary traffic each for separate treatment respectively by primary transceivers and secondary transceivers. Under abnormal network conditions, traffic from the active secondary feeder fiber is multiplexed downstream or demultiplexed upstream from or to the transceivers specifically arranged to deal with traffic from standby feeder fibers. As a result, traffic from the primary fiber is not disturbed at all. However, it is noted that if all the AWG ports were to be equipped with extra transceivers for secondary fiber traffic, the resulting overall configuration is analogous to initial 1:1 scheme. For cost and efficiency reasons, a network designer and/or operator might choose to provision less than all the router ports with secondary transceivers using filters in this away.

Figure 19A:
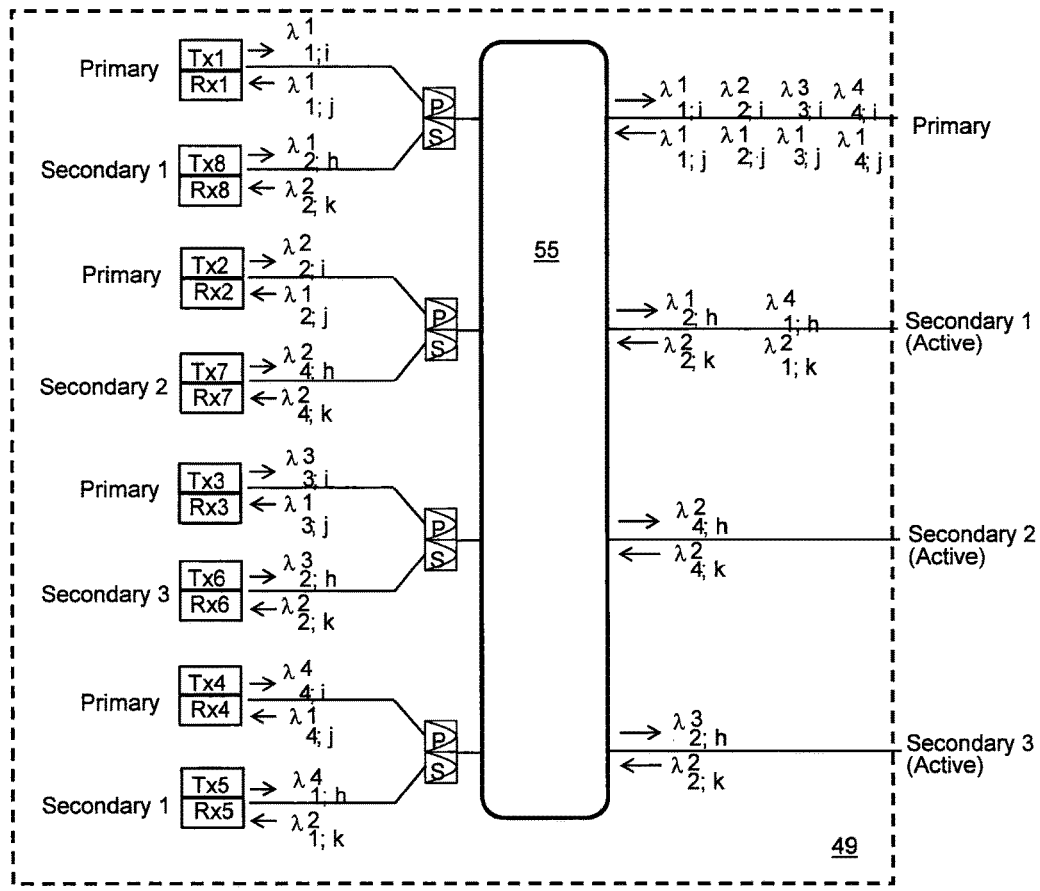
FIGS. 19A and 19B depict the operation of a 4×2 cyclic AWG router with multiple filters under network failure conditions.
Figure 19B:
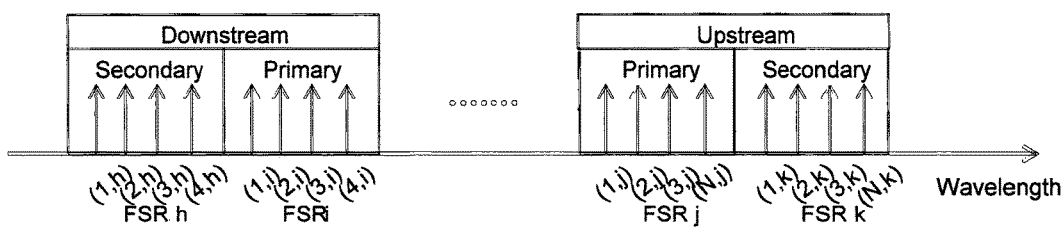

FIGS. 19A and 19B depicts a 4:1 configuration including an N×N AWG router comprising (in this case) 4×4 ports and further including band-pass filters directing any traffic from secondary fibers to specific backup transceivers. In general, an AWG can support up to N-1 secondary fibers, which can be seen from the three (active) secondary fiber links connected to the 4×4 AWG.

The apparatus, methods and configurations described above and in the drawings are for ease of description only and not meant to restrict the disclosure to any particular implementation or embodiment. It will be apparent to the skilled person that various sequences and permutations on the apparatus and methods described are possible within the scope of this disclosure.

For example, a PON port or LT can be used solely for standby purposes, to provide operational resilience to a number of remote nodes and their associated ODNs if any. It may also be possible for a single LT to provide a number of networks with working connections, although there may be capacity issues unless the amount of traffic to and from the multiple nodes is small.

In another example, it will be appreciated that although the preceding discussion has focused on PON and FTTC network architectures, embodiments could also be applied to other hybrid FTTx architectures, as well as other access network technologies like Ethernet, Hybrid Fiber/Coax, DOCSIS, and the like. Furthermore, while FIGS. 18A and 19A suggest that each primary transceiver has a corresponding secondary transceiver, it would be possible to selectively provide filters to specific primary transceivers. Moreover, secondary transceivers can be dynamically assigned to an activated secondary fiber depending on traffic load, and filters installed as and when needed.

The invention claimed is:

1. A multi-wavelength communications network comprising:
    a plurality of optical line terminals;
    a first network node operatively connected to a first one of the plurality of optical line terminals by a first primary connection via a PON port; and
    a second network node operatively connected to the first one of the plurality of optical line terminals by a second standby connection via the PON port, the second network node being also operatively connected to a second one of the plurality of optical line terminals by a third primary connection via a second PON port,
    wherein the first one of the plurality of optical line terminals operates under first network conditions by sending no data traffic to the second network node via the second standby connection and by sending first data traffic to the first network node via the first primary connection, and operates under second network conditions when the third connection fails by sending second data traffic to the second network node via the second standby connection and by sending the first data traffic to the first network node via the first primary connection,
    wherein the first network node and the first primary connection comprise a first passive optical network;
    wherein the second network node, the second standby connection and the third primary connection comprise a second passive optical network, and
    wherein the first one of the plurality of the optical line terminals sends data traffic to the first passive optical network and to the second passive optical network according to the first and second network conditions.

2. A multi-wavelength communications network according to claim 1 wherein the first network node and the second network node are respectively a splitter node in the first passive optical network and a splitter node in the second passive optical network.

3. A multi-wavelength communications network according to claim 1 wherein at least one of the first one or the second one of the plurality of optical line terminals is operatively connected to one or more further network nodes each via one or more connections.

4. A multi-wavelength communications network according to claim 1 wherein each of the first network node and the second network node is operatively connected to at least two of the plurality of optical line terminals by a primary connection for operation under the first network conditions, and a standby connection for operation under the second network conditions.

5. A multi-wavelength communications network according to claim 4 wherein each of the plurality of optical line terminals are geographically remotely from each other.

6. A multi-wavelength communications network according to claim 1, wherein the second network conditions are abnormal network conditions.

7. A method of operating a multi-wavelength communications network comprising a plurality of optical line terminals, a first network node operatively connected to a first one of the plurality of the optical line terminals by a first primary connection via a PON port, a second network node operatively connected to the first one of the plurality of optical line terminals by a second standby connection via the PON port, the second network node being also operatively connected to a second one of the plurality of optical line terminals by a third primary connection via to a second PON port, the method comprising:

under first network conditions, sending no data traffic to the second network node via the second standby connection and sending first data traffic to the first network node via the first primary connection; and under second network conditions when the third connection fails, sending second data traffic to the second network node via the second standby connection and by sending the first data traffic to the first network node via the first primary connection, wherein the first network node and the first primary connection comprise a first passive optical network, wherein the second network node, the second standby connection and the third primary connection comprise a second passive optical network, and wherein the first one of the plurality of optical line terminals sends data traffic to the first passive optical network and to the second passive optical network according to the first and second network conditions.

8. A method according to claim 7 further comprising filtering out signals received at the first one of the plurality of optical line terminals on the second standby connection during operation under the first network conditions.

9. A method according to claim 7 further comprising isolating data traffic received from the first network node from data traffic received from the second network node, during operation under the second network conditions.

10. A method according to claim 7 further comprising detecting a network fault condition triggering the second network conditions.

11. A method according to claim 10 further comprising reverting to operation of the network under first network conditions following rectification of the network fault condition.

12. A multi-wavelength communications network according to claim 4, wherein at least one of the plurality of optical line terminals comprises an arrayed wavelength grating router.

13. A multi-wavelength communications network according to claim 4, wherein at least one of the plurality of optical line terminals comprises a crosstalk filter to filter out signals received at the at least one of the plurality of optical line terminals on the second standby connection during operation under the first network conditions.

14. A multi-wavelength communications network according to claim 4, wherein at least one of the plurality of optical line terminals comprises a band pass filter to isolate data traffic received from the first network node from data traffic received from the second network node, during operation under the second network conditions.

15. A method according to claim 7, wherein the second network conditions are abnormal network conditions.

* * * * *